United States Patent [19]

Ruder

[11] 4,014,399
[45] Mar. 29, 1977

[54] MOUNT FOR HEAVY SERVO MECHANISMS

[75] Inventor: Joachim Ruder, Duisburg, Germany

[73] Assignee: Demag Aktiengesellschaft, Duisburg, Germany

[22] Filed: Oct. 20, 1975

[21] Appl. No.: 623,796

[52] U.S. Cl. .............................................. 180/8 C
[51] Int. Cl.² ......................................... B62D 57/02
[58] Field of Search ........................... 180/8 R, 8 C

[56] References Cited

UNITED STATES PATENTS

| | | | |
|---|---|---|---|
| 2,132,184 | 10/1938 | Poche | 180/8 C |
| 3,249,168 | 5/1966 | Klein | 180/8 C |
| 3,446,301 | 5/1969 | Thomas | 180/8 C |
| 3,512,597 | 5/1970 | Baron | 180/8 C |
| 3,807,519 | 4/1974 | Patch | 180/8 C |

Primary Examiner—Joseph F. Peters, Jr.
Assistant Examiner—R. Schrecengost
Attorney, Agent, or Firm—Mandeville and Schweitzer

[57] ABSTRACT

The invention covers a mounting structure for heavy duty equipment, such as excavators and the like, to provide rotary and linear feeding thereof to the work. The device has a ground support plate, preferably circular, surrounded by a spaced annular base. The base supports a concentric circular main support carrying the equipment mounting platform and suspends a mechanism including the ground support plate and a secondary support body. The ground support plate can be raised, lowered and horizontally displaced with respect to the main support and the secondary body with the ground plate as well as the devices used for raising, lowering and displacement may be turned around a vertical axis which is concentric with the main support.

7 Claims, 8 Drawing Figures

MOUNT FOR HEAVY SERVO MECHANISMS

BACKGROUND OF THE INVENTION

Czechoslovakian Pat. No. 94,372 teaches a mounting structure with a revolving disc on the main support carrying the mechanism, which disc pivots around a vertical axis. An intermediate body is arranged concentrically below this revolving disc, such intermediate body serving as movable support between the revolving disc and a support plate resting on the ground. Between the intermediate body and the support plate, hinged double acting cylinders, guide bolts and guide bearings are arranged vertically. A separate linear ball bearing race is provided between the revolving disc on the main support and the intermediate body, as well as a double acting cylinder causing the linear feeding. This device has certain disadvantages, however, particularly with respect to construction costs because of the separate arrangement of structural parts which induce and/or effect the required horizontal movement, and the vertical movement. This increases the space requirements for the equipment, as well as material costs. Furthermore, the center of gravity of the mechanism is relatively high, so that the stability of the mechanism is affected.

STATEMENT OF THE INVENTION

The object of this invention is to provide a mounting of this kind which is of lower structural height using less materials which, in turn, reduces overall costs. This invention provides a secondary support body directly axially at the main support to withstand tractive forces. The secondary body has connected thereto a plurality of spaced vertical reversible fluid power cylinders around the circumference in order to withstand compressive forces. The cylinders extend between the main support and the ground support plate. They are provided with linked slide blocks at the connection with the ground plate, which are moved on horizontal guide tracks located on top of the ground plate. Thus, each slide block and guide track has at least one power cylinder linked to the secondary body, as well as to the ground support plate, arranged to be movable in the approximate direction of the guide tracks.

The principal advantage of this invention compared to previous systems lies in its simple construction, including the elimination of an intermediate support plate, as well as the direct connection between the main support and the ground support plate. As a result, the secondary body is situated directly at the main support. This results simultaneously in a particularly low profile and center of gravity.

As another aspect of the invention, the secondary body is radially supported and concentrically positioned horizontally in a circular track provided with guide wheels at the main support, and is axially supported by an annular bearing formed by rolls or balls. The guide wheels providing for radial support are in pairs on rocking or swinging levers hinged at the intermediate body to accommodate relative horizontal displacement.

The slide blocks linking the piston rod ends of the reversible cylinder units and the guide tracks on the ground support plate are arranged to accommodate tractive as well as compressive forces vertically. Thus, raising the cylinder units raises the support plate, also.

At least two of the linear guide tracks are parallel with each other and equally spaced from the center axis of the ground plate, and one of the guide tracks and its related slide block is arranged to transmit horizontal forces not in the slide direction.

The vertical reversible cylinder units, at their ends facing the main support, are connected thereto with universal pressure pieces which rest and slide on an annular support provided on the bottom of the main support. These pressure pieces serve to transmit the pressure force from the ground support plate directly to the main support. Preferably, the vertical reversible cylinder units are synchronized to avoid tilting and undue pressures on individual units and their connections.

For a more detailed understanding of the invention, reference is made to the following detailed description of the attached drawings, in which a representative equipment mounting platform is shown illustrating one form of the invention.

DESCRIPTION OF THE DRAWINGS

Referring to the drawings in which like reference characters refer to like parts throughout the several views thereof, FIG. 1 shows a mounting platform 1, disposed on main support 2 of the structure which carries the mechanism of the invention. The outer circumference of main support 2 is provided with elements 3 connecting the main support 2 with annular support 4 resting on the ground. Connecting elements 3 and annular support 4 are shown as annular bodies. They may, however, consist of a plurality of circumferentially spaced individual supports and/or bases.

Figure 1:
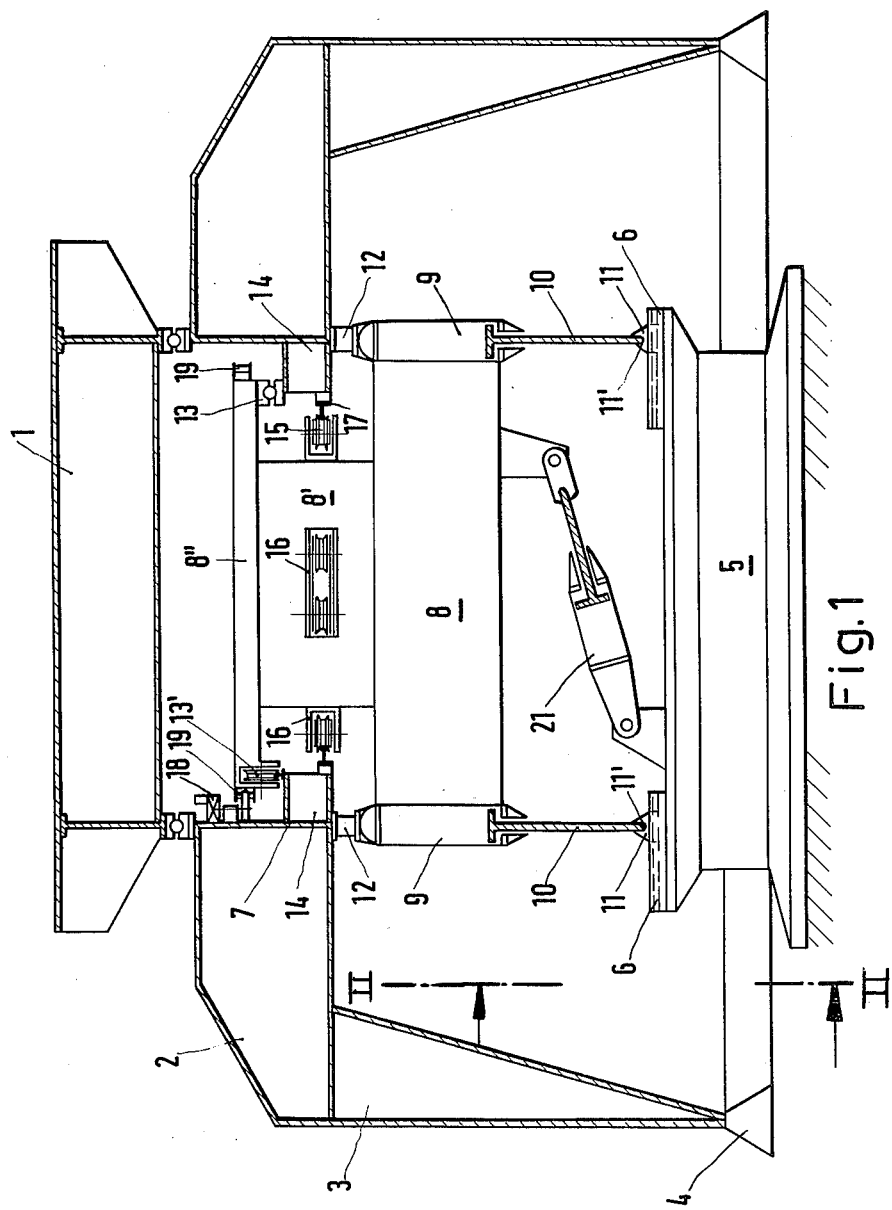
FIG. 1 is a cross sectional view in elevation of a mounting embodying the invention.

Ground support plate 5 is, preferably, a closed plate arranged within annular support 4. However, it may be configured as a ring. Ground plate 5 has positioned on top two parallel linear slides 6, each consisting of two tandem guide tracks. Main support 2 is annular, with a central opening 7. Within and below this opening 7 is a secondary support body 8, mounted to rotate around the vertical axis of main support 2. Body 8 carries reversible fluid cylinders 9, positioned concentrically with the center axis of body 8, adjacent main support 2, such cylinders 9 being firmly connected with body 8, with their axes being parallel with the axis of secondary body 8. The piston rods 10 of units 9 are provided with slide blocks 11 at their lower ends which, in conjunction with guide tracks 6 of ground plate 5, permit relative horizontal displacement between intermediate body 8 and ground plate 5. Slide blocks 11 are connected with rods 10 via links 11' which transmit compressive as well as tractive forces. The cylinder heads of units 9 are provided with universally hinged spring biased pressure pieces 12 resting against the bottom flange of annular main support 2.

The top portion 8" of secondary body 8 is a circular plate extending over center console ring 14 of main support 2. Plate 8" may be connected to ring 14 via a simple rotary ball joint 13 or via rollers with circular track 13'. Horizontal displacement of body 8 relative to main support 2 is effected by rollers 15 disposed on body 8, and preferably in pairs, mounted in rocking or swinging levers 16 and rolling on circular track 17 of console 14. The rotary motion of intermediate body 8 is induced by motor 18 attached to main support plate 2, via a gear and pinion engaging pinion ring 19 on the upper part 8" of secondary body 8.

Figure 2:
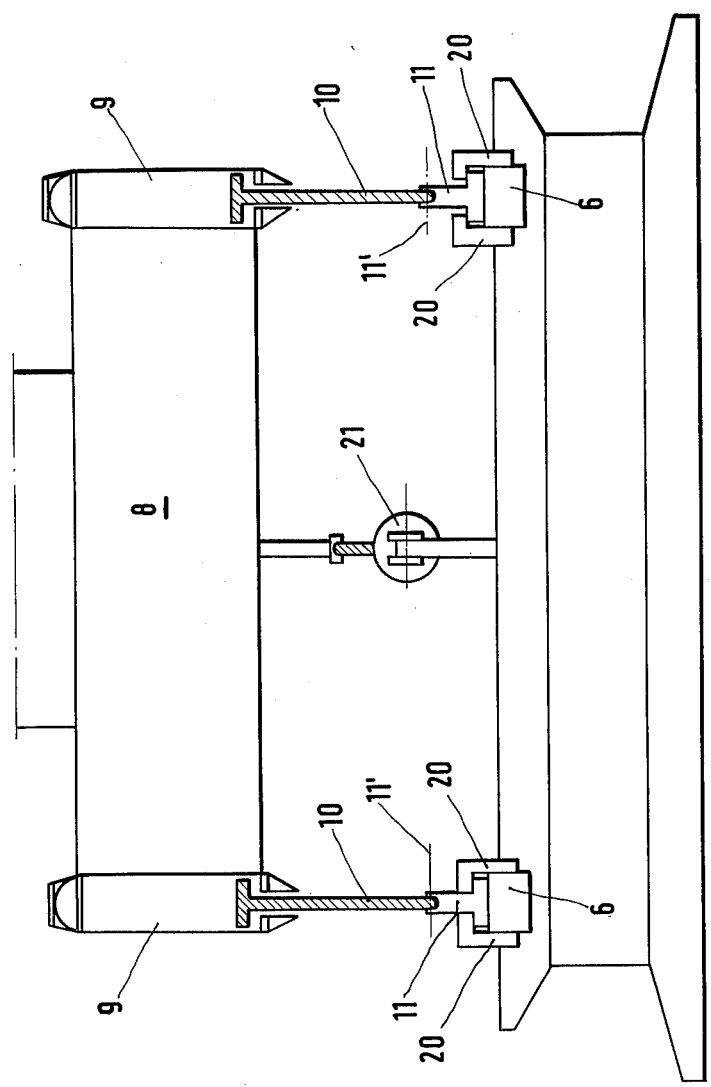
FIG. 2 is a cross sectional view along lines II—II of FIG. 1.

As shown in FIG. 2, slide blocks 11 are supported by piston rods 10 of piston units 9 on guide tracks 6 of ground support plate 5. When piston rods 10 are raised, the upper legs of L-shaped guide lugs 20 extending over the sides of T-shaped slide blocks 11, carry the latter and consequently plate 5, thus lifting ground plate 5 off the ground, while annular support 4 supports the mechanism on the ground.

Guide lugs 20 of guide tracks 6 surround slide blocks 11 on one side (in FIG. 2 left of the center axis) without lateral tolerance, while slide blocks 11 on the other side (in FIG. 2, right of the center axis) allow sufficient tolerance against the tracks. This provides a definite direction of movement laterally while accommodating lateral pressures between two adjacent cylinders. For the purpose of providing horizontal stepped movement of the mechanism, a reversible fluid cylinder 21 is linked to body 8 and to ground plate 5, so as to provide linear displacement therebetween. The length of each stepped horizontal movement may vary in accordance with the movement of cylinder 21.

Figure 3:
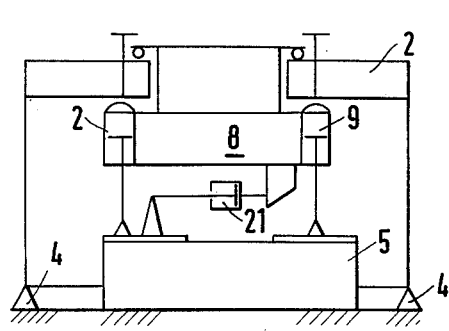
FIGS. 3–8 are diagrammatic showings of a sequence of movements of the device shown in FIG. 1.
Figure 4:
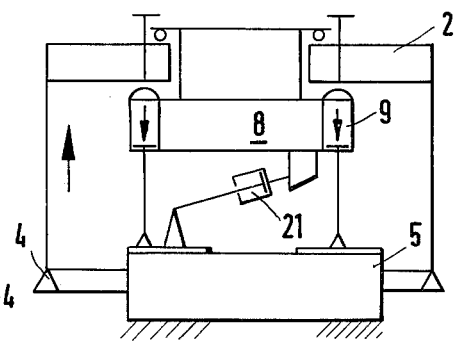

The device of FIGS. 1 and 2 may be moved in a series of stepped movements, as follows: in FIG. 3, annular support 4, as well as ground plate 5 rest on the ground. Fluid is fed to one end of cylinder 21 to bring it to one end position so that plate 5 is displaced relative to the center of main support 2 by half the distance of movement of feed cylinder 21, in the opposite direction. Thereafter, as shown in FIG. 4, support 4 is lifted off the ground via cylinder units 9. Fluid is fed to the upper side of the pistons in units 9 only to the extent necessary to lift support 4 off the ground, depending upon the depth to which support 4 and/or plate 5 sink into the ground.

Figure 5:
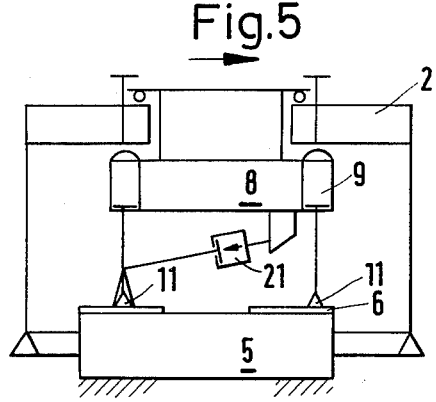

In FIG. 5, cylinder 21 is actuated in the opposite direction. This displaces main support 2, with secondary support 8 via slide blocks 11 in slide tracks 6 on the plate 5. As will be appreciated, units 9 and 21 may be operated from the same source of pressure fluid, with feeding to units 9 being blocked during feeding to cylinder 21. Fluid lines and controls have been omitted from the drawings for clarity, and because they are conventional and form no part of the invention.

Figure 6:
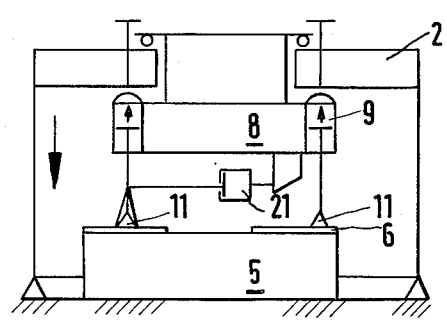
Figure 7:
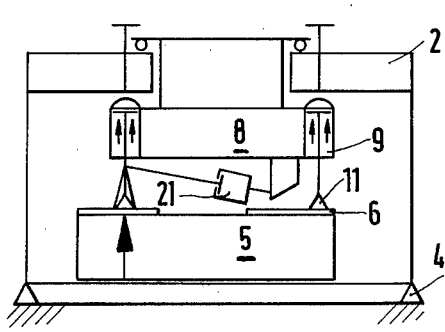
Figure 8:
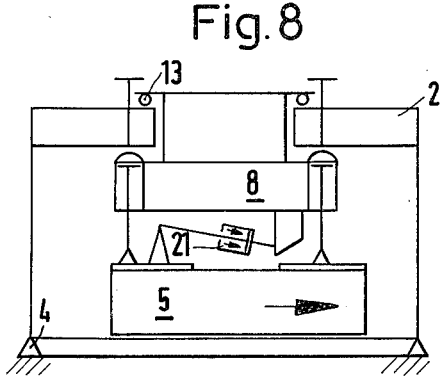

Then, the FIGS. 6 and 7, main support 2, with body 8 is lowered via units 9. This movement automatically causes the lifting of plate 5, after support 4 with the weight of connections 3 and main support 2, has firmly come to rest on the ground and any sinking into soft ground has been completed. The lifting of plate 5 is interrupted once it has cleared the ground. Subsequently, as shown in FIG. 8, raised plate 5 is displaced by feed cylinder 21 horizontally relative to main support 2, so that the positions of main support 2 and plate 5 approach those shown in FIG. 3. In this position, a change in direction may be brought about, according to the invention, by rotary connection 13 between main support 2 and body 8, so that support plate 5 and also the feed direction of the unit relative to main support 2 are turned accordingly. Ground plate 5 is then lowered by units 9 until the position of FIG. 3 is once more reached. Then the sequence may be repeated.

Thus, as will be apparent from the foregoing, there is provided, in accordance herewith, mounting apparatus for heavy duty equipment having a relatively low center of gravity and arranged to provide a stepwise rotary and linear feed for the equipment being supported. The rotary and linear feeds are combined in a relatively simple device arranged concentrically with the main support platform which reduces substantially, not only initial costs of construction, but also, space requirements of the device.

While the apparatus herein described forms preferred embodiments of this invention, this invention is not limited to these specific forms of apparatus, and changes can be made therein without departing from the scope of this invention, which is defined in the appended claims.

I claim:
1. A mounting providing linear and rotary feed for heavy duty equipment, characterized by
   a. an annular main support;
   b. a secondary support rotatably disposed on said main support and coaxial therewith;
   c. a plurality of vertical reversible fluid pressure cylinders each having a cylinder head and piston rod end fixedly disposed on said secondary support and spaced circumferentially therearound;
   d. a ground support plate;
   e. the cylinder heads of said plurality of cylinders resting against said annular main support;
   f. swingable slide blocks connected to the end of each piston rod of each of said plurality of fluid pressure cylinders;
   g. a guide track fixedly disposed on said ground support plate for slidably receiving each of said piston rod slide blocks;
   h. at least one substantially horizontal secondary reversible fluid pressure cylinder connected between said secondary support and said ground support plate, said secondary cylinder being mounted to move in the direction of said guide tracks; and
   i. said reversible fluid pressure cylinders being interconnected between said ground support plate and said annular main support to provide a direct vertical support between the ground support plate and the annular main support.

2. A mounting providing linear and rotary feed for heavy duty equipment, characterized by
   a. an annular main support;
   b. a secondary support rotatably disposed on said main support and coaxial therewith;
   c. a plurality of vertical reversible fluid pressure cylinders each having a cylinder head and piston rod end fixedly disposed on said secondary support and spaced circumferentially therearound;
   d. a ground support plate;
   e. the cylinder heads of said plurality of cylinders resting against said annular main support;
   f. swingable slide blocks connected to the end of each piston rod of each of said plurality of fluid pressure cylinders;
   g. a guide track fixedly disposed on said ground support plate for slidably receiving each of said piston rod slide blocks;
   h. at least one substantially horizontal secondary reversible fluid pressure cylinder connected between said secondary support and said ground support plate, said secondary cylinder being mounted to move in the direction of said guide tracks;
   i. first bearing means between said main support and said secondary support providing vertical support of said secondary support on said main support and relative rotation therebetween; and j. second bearing means between said main support and secondary support providing lateral concentric support and relative rotation therebetween.

3. The apparatus of claim 2, further characterized in that said second bearing means includes a. an annular radially extending track on said main support;

b. a plurality of pairs of radially extending guide wheels on said secondary support for engaging said radial track; and c. a swingable lever on said secondary support mounting each pair of said guide wheels for accommodating relative horizontal movement between said main support and said secondary support.

4. The apparatus of claim 2, further characterized by a. said slide blocks and their respective guide tracks are configured to withstand vertical tractive and compressive forces.

5. The apparatus of claim 2, further characterized by a. at least two of said guide tracks are positioned parallel with each other and spaced equidistant on each side of the axis of said support plate.

6. The apparatus of claim 5, further characterized by a. one of said guide tracks and its related slide blocks are configured to accommodate relative horizontal movement not in the slide direction.

7. A mounting providing linear and rotary feed for heavy duty equipment, characterized by a. an annular main support;

b. a secondary support rotatably disposed on said main support and coaxial therewith;

c. a plurality of vertical reversible fluid pressure cylinders each having a cylinder head and piston rod end fixedly disposed on said secondary support and spaced circumferentially therearound;

d. a ground support plate;

e. the cylinder heads of said plurality of cylinders resting against said annular main support;

f. swingable slide blocks connected to the end of each piston rod of each of said plurality of fluid pressure cylinders;

g. a guide track fixedly disposed on said ground support plate for slidably receiving each of said piston rod slide blocks;

h. at least one substantially horizontal secondary reversible fluid pressure cylinder connected between said secondary support and said ground support plate, said secondary cylinder being mounted to move in the direction of said guide tracks; and i. a universally hinged, resiliently biased pressure piece disposed on the cylinder heads of each of said plurality of reversible fluid pressure cylinders for rotary sliding engagement with said main support.

* * * * *